(12) United States Patent
Belinson

(10) Patent No.: US 7,698,629 B2
(45) Date of Patent: Apr. 13, 2010

(54) REPORT LAYOUT REFERENCE PROCESSING

(75) Inventor: Gregory Belinson, Gloucester (CA)

(73) Assignee: International Business Machines Corporation, Armonk, NY (US)

( * ) Notice: Subject to any disclaimer, the term of this patent is extended or adjusted under 35 U.S.C. 154(b) by 867 days.

(21) Appl. No.: 11/473,691

(22) Filed: Jun. 23, 2006

(65) Prior Publication Data

US 2007/0299805 A1     Dec. 27, 2007

(51) Int. Cl.
*G06F 17/00* (2006.01)
(52) U.S. Cl. .................. 715/222; 715/243; 715/273
(58) Field of Classification Search ........... 715/221, 715/222, 226, 243, 248, 249, 273; 707/1, 707/10; 711/100
See application file for complete search history.

(56) References Cited

U.S. PATENT DOCUMENTS

| | | | |
|---|---|---|---|
| 6,301,686 B1 * | 10/2001 | Kikuchi et al. ................ 716/2 |
| 7,020,697 B1 * | 3/2006 | Goodman et al. ........... 709/223 |
| 7,093,194 B2 * | 8/2006 | Nelson ....................... 715/234 |
| 7,139,766 B2 * | 11/2006 | Thomson et al. ............ 707/101 |
| 7,272,815 B1 * | 9/2007 | Eldridge et al. ............. 717/101 |
| 7,596,546 B2 * | 9/2009 | Matchett et al. ................ 707/3 |
| 2004/0054688 A1 * | 3/2004 | Tran ........................ 707/104.1 |
| 2006/0048048 A1 * | 3/2006 | Welcker et al. ............. 715/513 |
| 2006/0206860 A1 * | 9/2006 | Dardinski et al. ........... 717/105 |
| 2006/0233334 A1 * | 10/2006 | Bingaman et al. ........... 379/126 |
| 2007/0299860 A1 * | 12/2007 | Westman et al. ............ 707/102 |

OTHER PUBLICATIONS

Kelly, Steven, et al, "MetaEdit+ A Fully Configurable Multi-User and Multi-Tool CASE and CAME Environment", Department of Computer Science and Information Systems, University of Jyvaskyla, Finland, ISSN 0302-9743 (Print) 1611-3349 (Online), copyright 1996, pp. 1-21.*

* cited by examiner

*Primary Examiner*—Laurie Ries
(74) *Attorney, Agent, or Firm*—Stephen R. Tkacs; Stephen J. Walder, Jr.; Erin C. Ming

(57) ABSTRACT

A report layout reference mechanism for processing report layout references in a report is provided. The report layout reference mechanism comprises a report object model builder for generating a report object model of a report, a destination repository for storing the location of referenced objects, a report fetcher for obtaining reports having the referenced object, a specification repository for storing report specifications having the referenced object, and a content manager. The mechanism detects a layout component reference in a report fetching the component associated with the layout component reference, and adds the component to a complete report specification of the report.

15 Claims, 4 Drawing Sheets

REPORT LAYOUT REFERENCE PROCESSING

FIELD OF INVENTION

The present invention relates to report layouts, and in particular to a system and method of report layout reference processing.

BACKGROUND OF THE INVENTION

The concept of referencing external components is used in programming languages such as C++ to re-use code included in header files. There is no built in support for overrides and circular inclusion avoidance in such programming languages.

Until now, referencing portions of saved reports in a new report was performed by copying the referenced report into the new report. For groups of reports where certain portions are mandatory, it may become very time consuming to replicate the same report objects in a new report layout specification. Moreover, reports could not be processed with references to components which contained references as well.

SUMMARY OF THE INVENTION

A system and method of processing report layout references using XML specifications in the data source reporting. The system and method offer built-in capability of reference overrides and detection of circular dependencies for the report layout references.

In accordance with an embodiment of the present invention there is provided a report layout reference system for processing report layout references in a report. The report layout reference system comprises a report object model builder for generating a report object model of a report, a destination repository for storing the location of referenced objects, a report fetcher for obtaining reports having the referenced object, a specification repository for storing report specifications having the referenced object, and a content manager.

In accordance with an embodiment of the present invention there is provided a method of processing report layout references in a report. The method comprises the steps of detecting a layout component reference in a report fetching the component associated with the layout component reference, and adding the component to a complete report specification of the report.

In accordance with an embodiment of the present invention there is provided a memory containing computer executable instructions that can be read and executed by a computer for caring out a method of processing the layout of component references in a report. The method comprises the steps of detecting a layout component reference in a report, fetching the component associated with the layout component reference and adding the component to a complete report specification of the report.

In accordance with an embodiment of the present invention there is provided a carrier carrying a propagated signal containing computer executable instructions that can be read and executed by a computer. The computer executable instructions are used to execute a method of processing the layout of component references in a report. The method comprises the steps of detecting a layout component reference in a report, fetching the component associated with the layout component reference and adding the component to a complete report specification of the report.

This summary of the invention does not necessarily describe all features of the invention.

BRIEF DESCRIPTION OF THE DRAWINGS

These and other features of the invention will become more apparent from the following description in which reference is made to the appended drawings wherein.

DETAILED DESCRIPTION

This patent describes an algorithm for processing report layout references using XML specifications in the word of database reporting and offers built-in capability of reference overrides and detection of circular dependencies for the report layout references.

Figure 1:
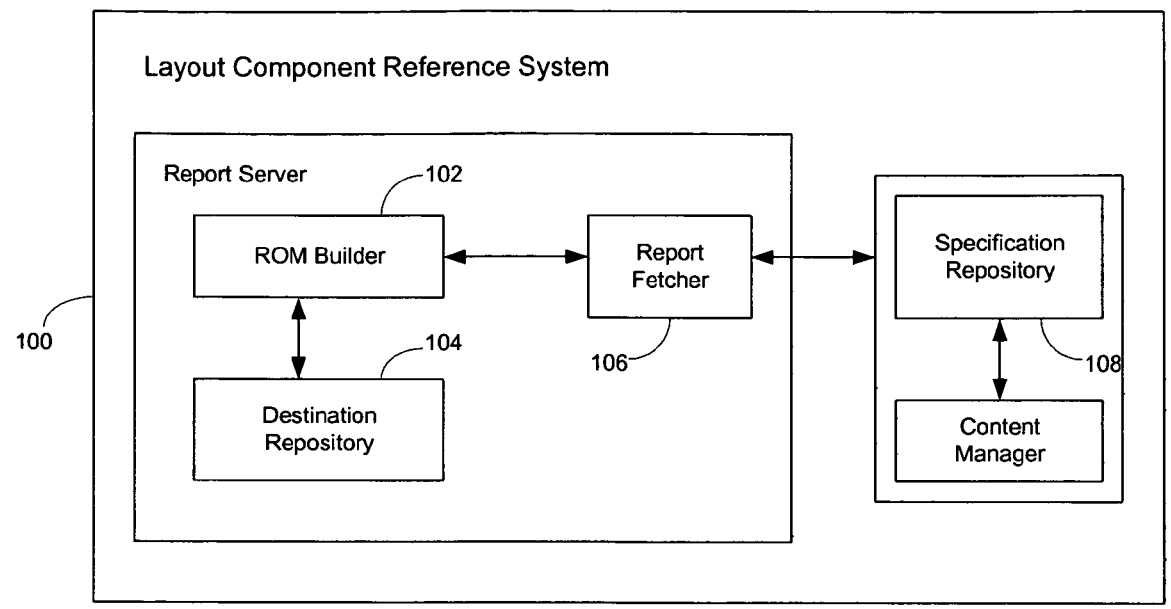
FIG. 1 shows in a block diagram an example of a layout component reference system for processing the layout of component references in a report, in accordance with an embodiment of the present invention

FIG. 1 shows in a block diagram an example of a layout component reference system 100 for processing the layout of component references in a report, in accordance with an embodiment of the present invention. The layout component reference system 100 comprises a report object model (ROM) builder 102 for generating a ROM of a report, a destination repository 104 for storing the location of report specifications, a report fetcher 106 for obtaining reports, a specification repository 108 for storing report specifications, and a content manager 110.

Figure 2:
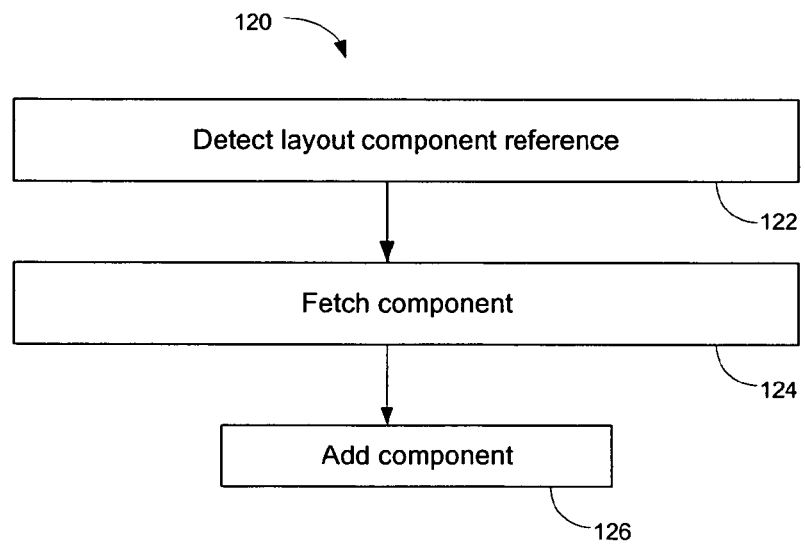
FIG. 2 shows in a flowchart an example of a method of processing the layout of component references in a report, in accordance with an embodiment of the layout component reference system.

FIG. 2 shows in a flowchart an example of a method of processing the layout of component references in a report (120), in accordance with an embodiment of the layout component reference system 100. The method (120) comprises the steps of detecting a layout component reference (122) in a report. The component is fetched and added to the complete report specification (124).

Figure 3:
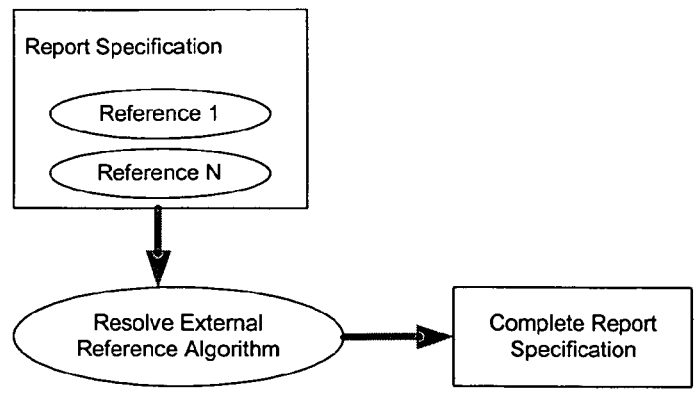
FIG. 3 shows in a process flowchart an example of the processing of reference named layout components, in accordance with an embodiment of the layout component reference system.

The layout component reference system 100 references named layout components within present or external specifications in such a way that that a referenced element is rendered as if it was positioned in the given location. FIG. 3 shows in a process flowchart an example of the processing of reference named layout components 150, in accordance with an embodiment of the layout component reference system 100. A report specification 152 containing N references 154 is resolved by an external reference method (120) resulting in a complete report specification 158. Optionally, any named layout components within the layout component being referenced may be overridden with a different layout component. A layout component reference can point to a report object containing other named objects or layout component references. The named objects contained in the object being referenced could be overridden in order to customize a current report only. An element, preferably a pointer XML element is used to reference a named layout element from within this report or another report. The layout element will be rendered in its place without containing structure.

Figure 4:
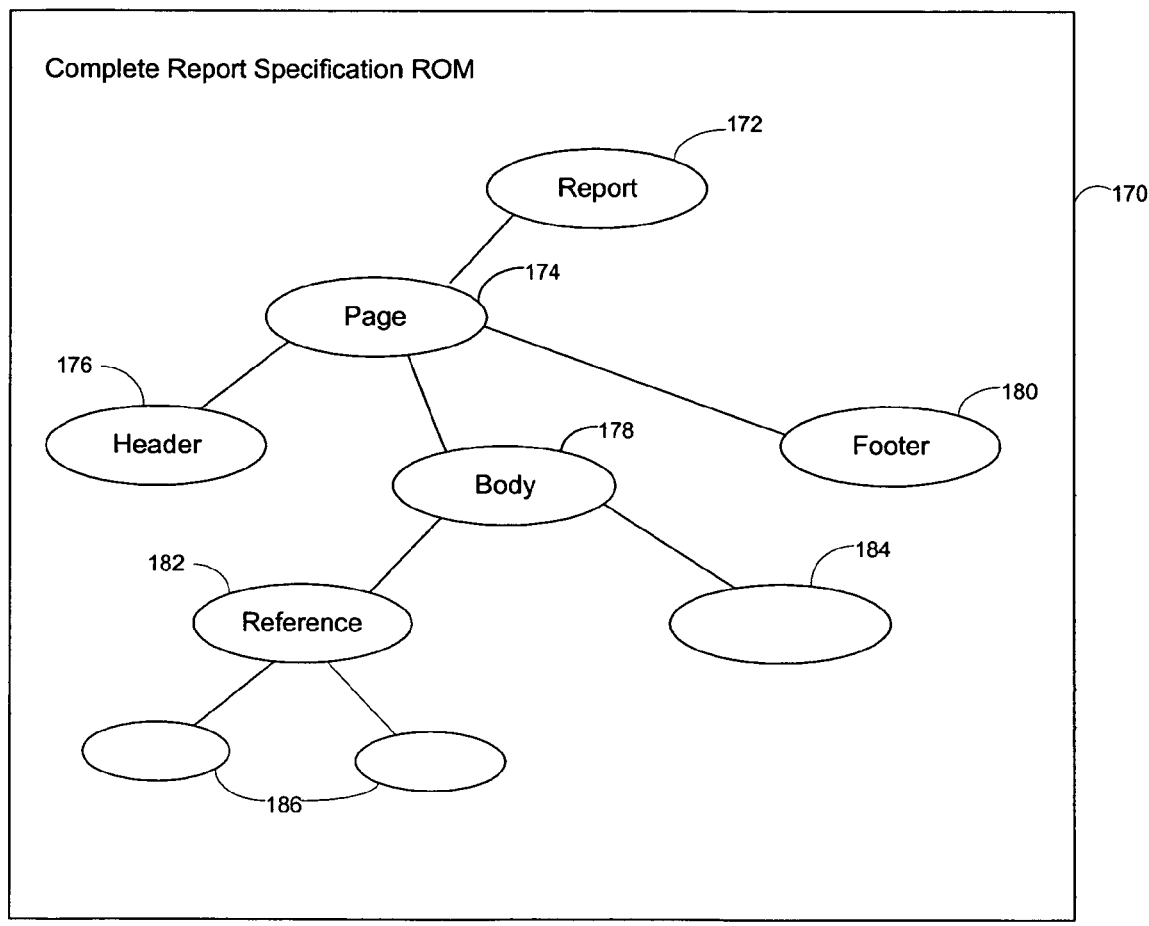
FIG. 4 shows in a tree diagram an example of a complete report specification ROM, in accordance with an embodiment of the layout component reference system.

FIG. 4 shows in a tree diagram an example of a complete report specification ROM 170, in accordance with an embodiment of the layout component reference system 100. The ROM 170 comprises a report node 172 which has a page node 174 as a child. The page node 174 has a header node 176, a body node 178 and a footer node 180 as child nodes. The body node 178 has a reference node 182 and one or more body content nodes 184 as child nodes. The reference node 184 has one or more reference content nodes 186. The reference content nodes 186 are obtained by the layout component reference system 100. Each leaf node has attributes. One attribute of the leaf nodes is the location of its parent and child nodes. In the circular event that a component X and a location Y are in the same repository, then an error message is presented to the report builder. In the event of A referencing component X, which in its turn contains a reference to A (in a simple case scenario), regardless of the location the resolution server detects a circular dependency and signals to present an error message to the report builder.

Figure 5:
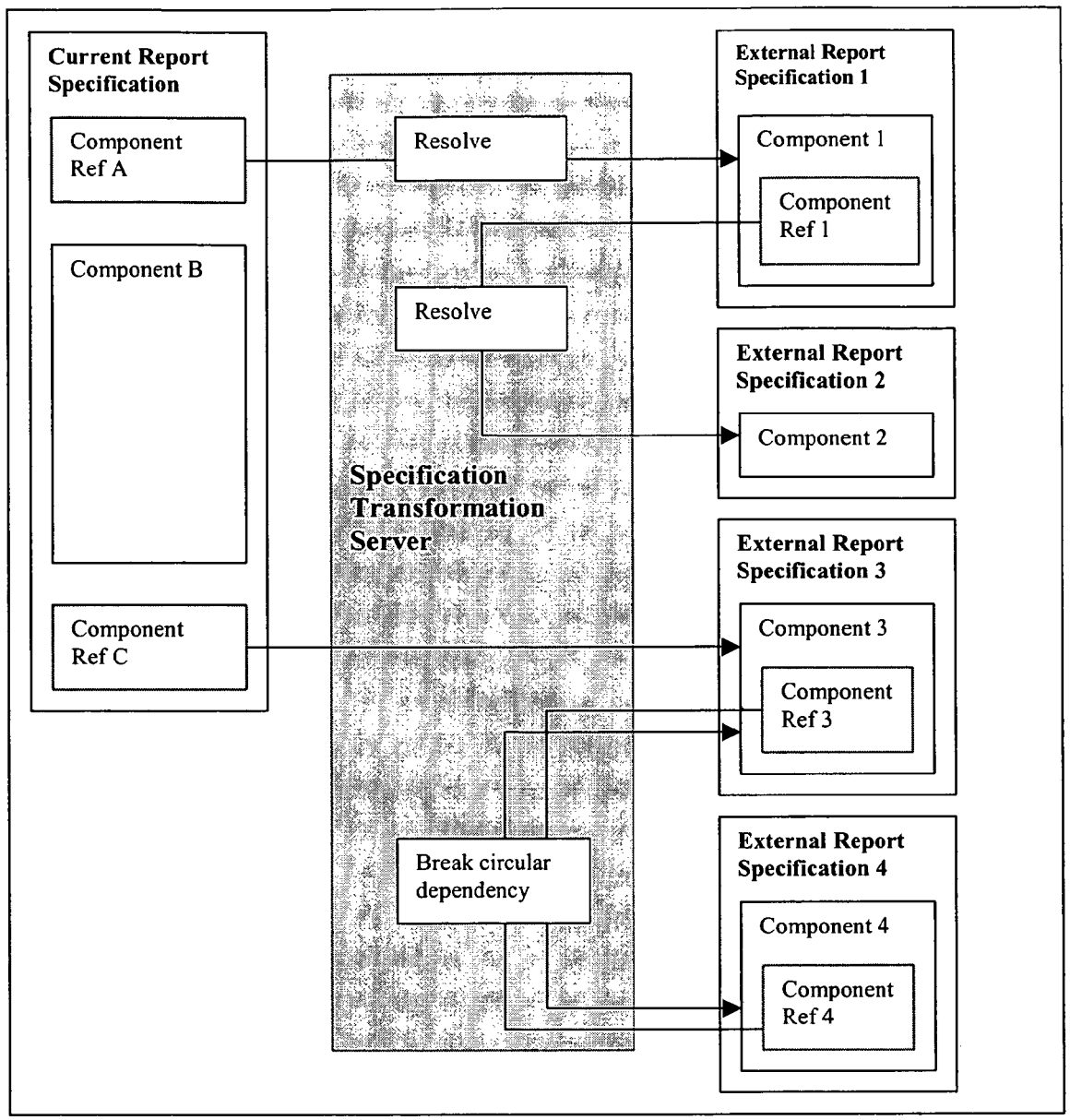
FIG. 5 shows in a component diagram an example of the resolution of multiple component references through the use of a specification transformation server, in accordance with an embodiment of the layout component reference system.

If the component referenced is in another report, then this optional element may be used to hold a copy of the referenced component. When rendering, this copy will be used if available. This component allows for design time references versus run time references. FIG. 5 shows in a component diagram an example of the resolution of multiple component references through the use of a specification transformation server 200, in accordance with an embodiment of the layout component reference system 100. The specification transformation server 200 receives a current report specification 190 having components and reference components and is used to create external report specifications 202. The specification transformation server 200 includes the layout component reference system 100. In the example provided in FIG. 5, a current report specification 190 containing component reference A 192 component B 194 and component reference C 196 has its component references A 192 and C 196 resolved in external report specifications 1 202 and 3 204. Component reference A 192 is resolved into component 1 206 which, in this example, contains a component reference 1 208. Component reference 1 208 is resolved as component 2 210. Component reference C 196 is resolved into component 3 204 which, in this example, has component reference 3 212. Component reference 3 212 is resolved as component 4 212 which, in this example, has component reference 4 214. When component reference 4 is resolved, it is found to be component reference 3 212. This leads to a circular reference which is detected and broken. While traversed, the paths to layout component are positioned in a map data structure storage. As soon as it is detected that an incoming layout component reference has been already stored, indication of a circular dependency presence is given, which results in report processing interruption and a presentation of an error message to the report builder. Although there is no built-in support for overrides and circular inclusion avoidance in programming languages such as C++, such functionality is implemented using primitives provided by the pre-processor.

Figure 6:
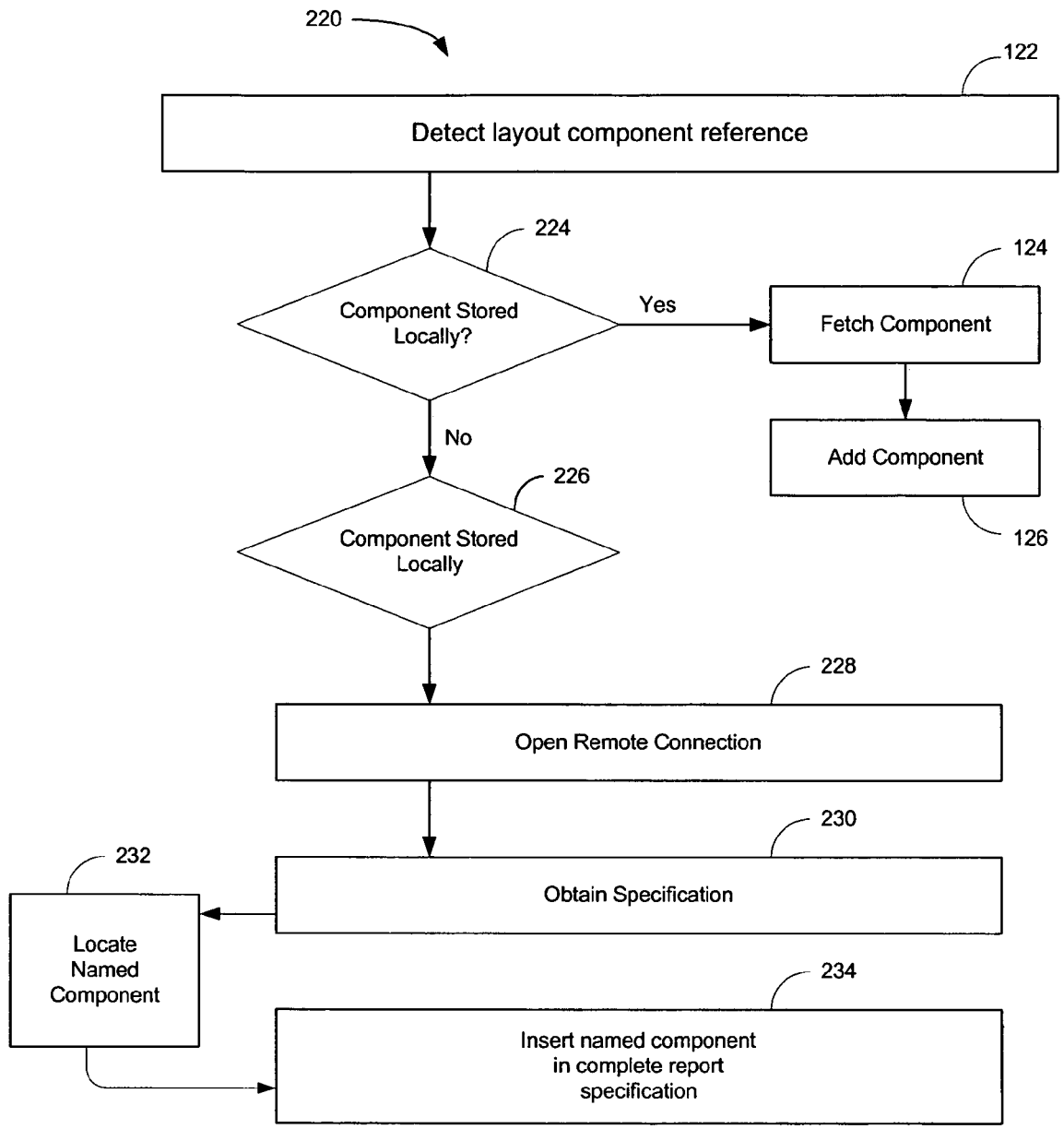
FIG. 6 shows in a flowchart another example of a method of processing the layout of component references in a report, in accordance with an embodiment of the layout component reference system.

FIG. 6 shows in a flowchart another example of a method of processing the layout of component references in a report (220), in accordance with an embodiment of the layout component reference system 100. The method (220) comprises the steps of detecting a layout component reference (222) in a report. If the component is stored locally (224), then the component is fetched and added to the complete report specification (226). If the component is stored remotely (226), then a remote connection is opened to its content manager (228). The specification of the remote report is obtained (230) and the named component that is referenced is located (232). Once located (232), the referenced component is inserted in the complete report specification (234).

The layout component reference system 100 has many advantages. It allows re-using named layout components defined in external reports in a new report specification. It is capable of resolving references to components which contain references themselves. It provides flexibility to override certain portions of a referenced sub-component. It saves on physical report size.

The report layout reference system 100 and methods of the present invention may be implemented by any hardware, software or a combination of hardware and software having the above described functions. The software code, either in its entirety or a part thereof, may be stored in a computer readable memory. Further, a computer data signal representing the software code which may be embedded in a carrier wave may be transmitted via a communication network. Such a computer readable memory and a computer data signal and its carrier are also within the scope of the present invention, as well as the hardware, software and the combination thereof.

The present invention has been described with regard to one or more embodiments. However, it will be apparent to persons skilled in the art that a number of variations and modifications can be made without departing from the scope of the invention as defined in the claims.

What is claimed is:

1. A report layout reference system for processing report layout references in a report, the report layout reference system comprising:

a report object model builder for generating a report object model of a report specification;

a destination repository for storing a location of referenced report components, a report fetcher for obtaining a report specification having a referenced report component; and a specification repository for storing report specifications having referenced report components, wherein the report layout reference system receives a current report specification from the specification repository, the current report specification comprising at least one component reference that references at least one report component of at least one external report specification, obtains the at least one referenced report component of the at least one external report specification, and adds the at least one referenced report component to the current report specification to form a complete report specification.

2. The system as claimed in claim 1, wherein the report layout reference system determines that the report component associated with the layout component reference is not stored locally.

3. The system of claim 2, wherein responsive to a determination that the layout component is not stored locally, the report layout reference system opens a remote connection, obtains the external report specification via the remote connection, and locates the report component in the external report specification.

4. The system of claim 1, wherein responsive to detecting a circular dependency in the report component associated with the layout component reference, the report layout reference system interrupts report processing.

5. The system of claim 1, wherein responsive to detecting a circular dependency in the report component associated with the layout component reference, the report layout reference system presents an error message to the report object model builder.

6. A method, in a report layout reference system, for processing the layout of component references in a report, the method comprising:
   receiving, by a report object model builder of the report layout reference system, a current report specification from a specification repository of the report layout reference system;
   detecting, by the report object model builder, a layout component reference in the current report specification, wherein the layout component reference references a report component of an external report specification;
   fetching, by a report fetcher of the report layout reference system, the report component associated with the layout component reference; and
   adding the report component associated with the layout component reference to the current report specification to form a complete report specification.

7. The method of claim 6, further comprising:
   determining that the report component associated with the layout component reference is not stored locally.

8. The method of claim 7, wherein responsive to a determination that the layout component is not stored locally, the method further comprises:
   opening a remote connection;
   obtaining the external report specification via the remote connection; and
   locating the report component in the external report specification.

9. The method of claim 6, further comprising:
   responsive to detecting a circular dependency in the report component associated with the layout component reference, interrupting report processing.

10. The method of claim 6, further comprising:
   responsive to detecting a circular dependency in the report component associated with the layout component reference, presenting an error message to the report object model builder.

11. A memory containing computer executable instructions that can be read and executed by a computer for carrying out a method of processing the layout of component references in a report, the method comprising:
   receiving, by a report object model builder of the report layout reference system, a current report specification from a specification repository of the report layout reference system;
   detecting, by the report object model builder, a layout component reference in the current report specification, wherein the layout component reference references a report component of an external report specification;
   fetching, by a report fetcher of the report layout reference system, the report component associated with the layout component reference; and
   adding the report component associated with the layout component reference to the current report specification to form a complete report specification.

12. The memory of claim 11, wherein the method further comprises:
   determining that the report component associated with the layout component reference is not stored locally.

13. The memory of claim 12, wherein responsive to a determination that the layout component is not stored locally, the method further comprises:
   opening a remote connection;
   obtaining the external report specification via the remote connection; and
   locating the report component in the external report specification.

14. The memory of claim 11, wherein the method further comprises:
   responsive to detecting a circular dependency in the report component associated with the layout component reference, interrupting report processing.

15. The memory of claim 11, wherein the method further comprises:
   responsive to detecting a circular dependency in the report component associated with the layout component reference, presenting an error message to the report object model builder.

* * * * *